United States Patent
Baker et al.

(10) Patent No.: US 7,634,434 B2
(45) Date of Patent: Dec. 15, 2009

(54) SYSTEMS AND METHODS FOR TRANSACTION TRIGGERED CYCLING OF FINANCIAL ACCOUNTS

(75) Inventors: Daniel Guy Baker, Glen Allen, VA (US); Krishnamurthy Bindumadhavan, Richmond, VA (US); Bradley Wilson Jiulianti, Boise, ID (US); Sanjeev Kumar Chandak, Glen Allen, VA (US)

(73) Assignee: Capital One Financial Corporation, McLean, VA (US)

( * ) Notice: Subject to any disclaimer, the term of this patent is extended or adjusted under 35 U.S.C. 154(b) by 1342 days.

(21) Appl. No.: 10/156,072

(22) Filed: May 29, 2002

(65) Prior Publication Data

US 2003/0225642 A1 Dec. 4, 2003

(51) Int. Cl.
*G06Q 40/00* (2006.01)
(52) U.S. Cl. ............................... 705/35; 705/38; 705/39
(58) Field of Classification Search ............... 705/38–39
See application file for complete search history.

(56) References Cited

U.S. PATENT DOCUMENTS

| 6,092,055 | A | * | 7/2000 | Owens et al. | 705/34 |
| 2002/0165808 | A1 | * | 11/2002 | Zamsky et al. | 705/35 |
| 2003/0101131 | A1 | * | 5/2003 | Warren et al. | 705/38 |

* cited by examiner

*Primary Examiner*—Jagdish N. Patel
*Assistant Examiner*—Jason M Borlinghaus
(74) *Attorney, Agent, or Firm*—Finnegan, Henderson, Farabow, Garrett & Dunner, LLP

(57) ABSTRACT

Systems and methods are provided for setting a cycle date for a financial account. For instance, a cycling module may be provided to set a default cycle date for cycling the financial account, and an account monitoring module may be provided to determine whether a transaction is posted on the financial account within a first predetermined period before the default cycle date. If a transaction is posted on the financial account within the first predetermined period, then the cycling module sets a new cycle date. The new cycle date can be set to a date that follows the transaction post date by a second predetermined period. Alternatively, the new cycle date may be set to other dates, such as a date corresponding to the next qualifying date.

12 Claims, 4 Drawing Sheets

| ACCOUNT NUMBER | DEFAULT CYCLE DATE | TRANSACTION POST DATE | NEW CYCLE DATE |
|---|---|---|---|
| 0001 | 25th of the Month | 16th of the Month | 17th of the Month |
| 0002 | 20th of the Month | 21st of the Month | 20th of the Month |
| 0003 | 24th of the Month | 18th of the Month | 20th of the Month |

FIG. 2

SYSTEMS AND METHODS FOR TRANSACTION TRIGGERED CYCLING OF FINANCIAL ACCOUNTS

BACKGROUND OF THE INVENTION

I. Field of the Invention

The present invention generally relates to financial account systems and related methods. More particularly, the invention relates to systems and methods for transaction triggered cycling of financial accounts.

II. Background and Material Information

Traditionally, financial institutions that issue financial products, such as credit card products, set a default cycle date. The default cycle date may be used by the financial institution for sending out, for example, a credit card statement indicating an outstanding balance and due date for payment. Such default cycle dates may be set to a predetermined period or number of days following the date on which a new credit card account is opened. Setting up a default cycle date, however, with no relationship to transactions made using a financial product can result in various drawbacks. For example, there is a risk of non-payment and/or the accumulation of losses to a credit card issuer, particularly when new credit card users use all of their available credit and fail to pay for their charged transactions.

Accordingly, there is a need to reduce the financial risk associated with issuing new accounts, such as credit card accounts. Further, there is a need to reduce account delinquency and the losses suffered by financial institutions, such as banks and credit card issuers, arising from charge-offs of bad or delinquent accounts.

SUMMARY OF THE INVENTION

Systems and methods consistent with embodiments of the present invention reduce the risks associated with issuing financial accounts, such as credit card accounts. Further, embodiments of the invention include systems and methods for reducing account delinquency and the losses suffered by financial institutions, such as banks and credit card issuers, due to charged-off accounts.

In accordance with embodiments of the invention, systems and methods are provided for transaction triggered cycling of financial accounts. The financial account may be a credit card account, a debit card account, or any other financial product or service.

According to an embodiment of the invention, a method is provided for setting a cycle date for a financial account. The method may set a default cycle date for cycling the financial account. Thereafter, a determination may be made as to whether a transaction is posted on the financial account within a first predetermined period before the default cycle date. If the transaction is posted within the first predetermined period before the default cycle date, then a new cycle date may be set that follows the transaction post date by a second predetermined period.

According to another embodiment of the invention, a method is provided for setting a cycle date for a financial account. The method may set a default cycle date for cycling the financial account. The method may then determine whether a transaction is posted on the account within a first predetermined period before the default cycle date. If the transaction is posted within the first predetermined period before the default cycle date, then a new cycle date may be set as the next qualifying date.

In accordance with yet another embodiment of the invention, a system is provided for setting a cycle date for a financial account is provided. The system may comprise means for setting a default cycle date for cycling the financial account. Further, the system may include means for determining whether a transaction is posted on the financial account within a first predetermined period before the default cycle date, and means for setting a new cycle date that follows the transaction post date by a second predetermined period, if the transaction is posted on the financial account within a first predetermined period before the default cycle date.

According to still another embodiment of the present invention, a system is provided for setting a cycle date for a financial account. The system may comprise means for setting a default cycle date for cycling the financial account. In addition, the system may further comprise means for determining whether a transaction is posted on the financial account within a first predetermined period before the default cycle date, and means for setting a new cycle date as the next qualifying date, if the transaction is posted on the financial account within a first predetermined period before the default cycle date.

According to yet another embodiment consistent with the present invention a method for setting a cycle date for a credit card account is provided. The method sets a default cycle date, when the credit card account is first established, for cycling the credit card account. The method then determines whether a transaction is posted on the credit card account before the default cycle date. And, if the transaction is posted before the default cycle date, then the method sets a new cycle date that follows the transaction post date by a predetermined period. The method then cycles the credit card account, wherein cycling the credit card account includes sending a first account statement to a holder of the credit card account.

Both the foregoing general description and the following detailed description are exemplary and are intended to provide further illustration and explanation of the embodiments of the invention as claimed.

BRIEF DESCRIPTION OF THE DRAWINGS

The accompanying drawings, which are incorporated in and constitute a part of this specification, illustrate various embodiments and aspects of the present invention. In the drawings:

FIG. 2 depicts an exemplary accounts transaction table, consistent with embodiments of the present invention;

DETAILED DESCRIPTION

Systems and methods consistent with embodiments of the present invention reduce the risks associated with issuing financial accounts, such as credit card accounts. Further, embodiments of the invention include systems and methods for reducing account delinquency and the losses suffered by financial institutions, such as banks and credit card issuers, due to charged-off accounts.

In accordance with embodiments of the invention, systems and methods are provided that perform transaction triggered cycling of financial accounts, such as credit card accounts. For example, systems and methods consistent with embodiments of the invention may set a cycle date for a financial account based on when a transaction is posted on the financial account thereby reducing the period during which additional charge-offs could occur. Systems and methods of the invention may be applied to new financial accounts and/or existing financial accounts of an institution. Further, in accordance with an embodiment of the invention, the disclosed systems and methods of the invention may be applied to all customers of a financial institution or only to customers with a poor credit history or that are determined to pose a predetermined risk to the financial institution (which may be determined by a customer's risk score).

Embodiments of the invention may be implemented in various system or network environments. Such environments and applications may be specially constructed for performing the various processes and operations of the embodiments of the invention or they may include a general-purpose computer or computing platform selectively activated or reconfigured by program code to provide the necessary functionality. The systems and methods disclosed herein are not inherently related to any particular computer or other apparatus, and may be implemented by a suitable combination of hardware, software, and/or firmware. For example, various general-purpose machines may be used with programs written in accordance with teachings of the embodiments of the invention, or it may be more convenient to construct a specialized apparatus or system to perform the required methods and techniques.

Embodiments of the invention also relate to computer readable media that include program instruction or program code for performing various computer-implemented operations based on the methods and processes of the embodiments. The media and program instructions may be those specially designed and constructed for the purposes of the embodiments of the invention, or they may be of the kind well known and available to those having skill in the computer software arts. Examples of program instructions include both machine code, such as produced by compiler, and files containing a high level code that can be executed by the computer using an interpreter.

Figure 1:
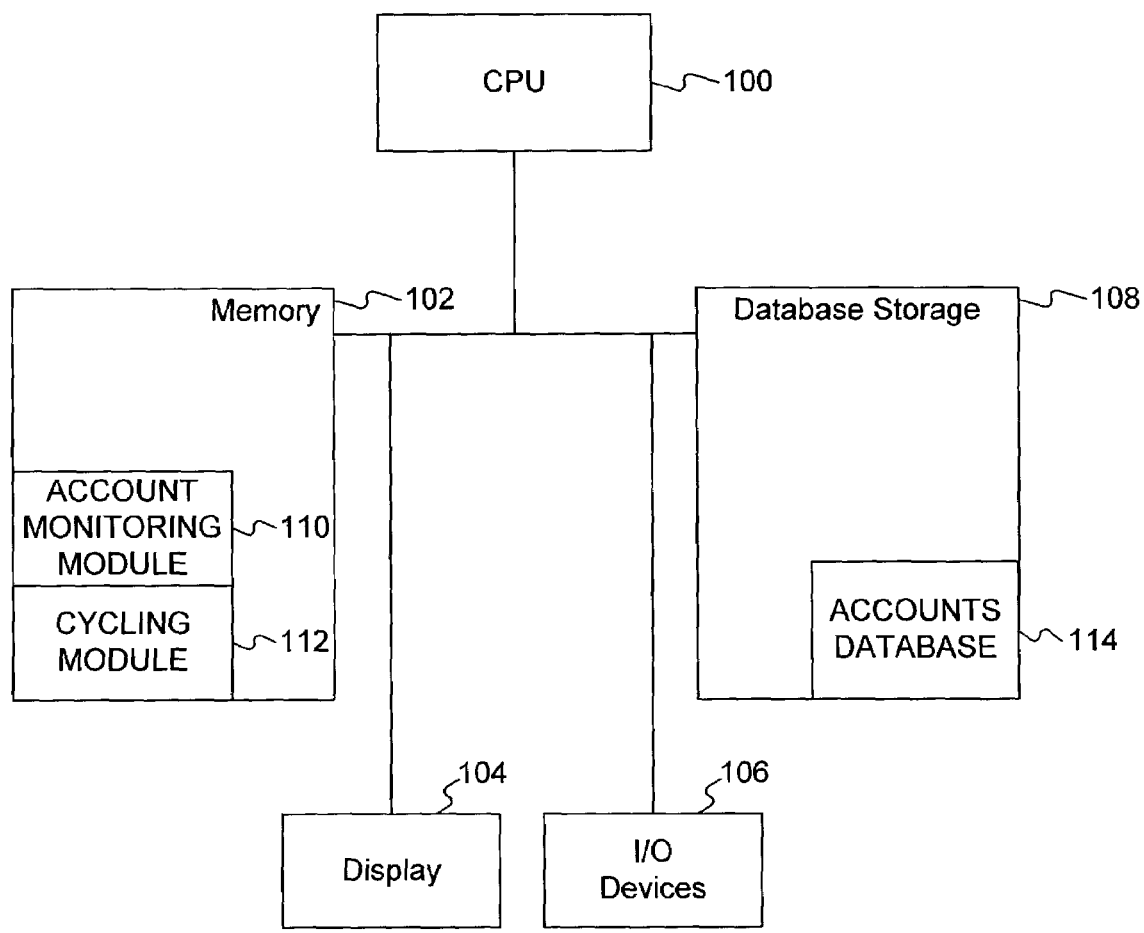
FIG. 1 illustrates an exemplary system environment, consistent with embodiments of the present invention.

FIG. 1 is an illustration of an exemplary system environment, consistent with embodiments of the present invention. As shown in FIG. 1, the exemplary system may include a number of components, including a central processing unit (CPU) 100, a memory 102, a display 104, input/output (I/O) devices 106, and/or a database 108. The components of the exemplary system of FIG. 1 may be implemented through any suitable combination of hardware, software and/or firmware. Such components may be integrated and/or directly or indirectly connected with one another. For example, the disclosed components may be implemented using one or more general-purpose computer(s) or computing platform(s) selectively activated or reconfigured by program code to provide the necessary functionality.

Memory 102 may store software-based modules or computer program instructions for performing various functions. For instance, in the exemplary embodiment of FIG. 1, memory 102 may include an account monitoring module 110 and a cycling module 112, which when executed by CPU 100 provide functionality associated with embodiments of the invention. Although FIG. 1 depicts only one CPU, one skilled in the art will appreciate that other processors may be used as part of the system.

Display 104 may be a conventional cathode ray tube display, liquid crystal display, or any other display, such as a plasma display, which can display information. I/O devices 106 include, but are not limited to, devices such as a keyboard, a mouse, a printer, a scanner, or any other device capable of inputting or outputting data.

Database 108, which is connected to other parts of the exemplary system of FIG. 1, may be implemented with a storage device, such as a high-density memory or storage device. Such a storage device may be implemented to provide the persistent storage of data. As shown in FIG. 1, database 108 may include an accounts database 114 for storing account information of a financial institution. Database 108 may be either directly connected or integrated with the rest of the system, or it may be indirectly connected via a communication network, such as a local area network, or the Internet. Also, the data residing in accounts database 114 may be distributed over various databases or tables.

Account monitoring module 110, among other things, monitors activity related to a financial account. Thus, for example, account monitoring module 110 may monitor and keep track of transactions posted on a credit card account. Account monitoring module 110 may be implemented in software using any programming language and it may include or interface with program libraries, application program interfaces, operating systems, or other software. Cycling module 112, among other things, may automatically set a default cycle date for a financial account. It may also set the cycle date to a new date based on the activity related to a financial account. Cycling module 112 may be implemented in software using any programming language and it may include or interface with program libraries, application program interfaces, operating systems, or other software. The functionality of the account monitoring module and the cycling module may be combined into a single module or it may be distributed into several modules.

FIG. 2 is an illustration of an exemplary accounts table 200, consistent with embodiments of the present invention. Table 200 may reside or be stored in a database, such as the accounts database of FIG. 1. Alternatively or additionally, table 200 may be part of a relational database or any other conventional database arrangement. Accounts table 200 may contain, for example, data concerning different financial accounts of an institution.

Consistent with embodiments of the invention, the data of table 200 may be structured or stored according to various conventional techniques or arrangements. For example, the data be structured or stored using data strings or linked lists. Further, as illustrated in FIG. 2, table 200 may be structured to provide several rows and/or columns of information for financial accounts, such as credit card accounts. For example, a column 202 may be provided in table 200 to list account numbers identifying the unique financial accounts of customers or users. Column 204 may include a default cycle date for each account identified in column 202 and column 206 may include a transaction post date corresponding to each account identified in column 202. Also, column 208 may include a new cycle date for each account identified in column 202.

As used herein the term "cycle date" includes but is not limited to the date on which an account statement, such as a billing statement, is sent to a financial account holder, is received by the financial account holder, and/or is processed by the financial account issuer. An account statement may be sent electronically or may be posted, for example, on a website on the Internet. The term "cycle date" is used herein with reference to a "default cycle date" and a "new cycle date." Consistent with embodiments of the invention, a default cycle date includes but is not limited to the cycle date that is originally assigned to a new or existing account, and a new cycle date includes but is not limited to the cycle date that is used in place of the default cycle date for a new or existing account. Further, as used herein, the term "transaction post date" includes but is not limited to the day the transaction is made on the financial account, the day the transaction is approved, the day on which the transaction is recorded by the issuer of the financial account, or the day the transaction is posted to the account by a financial institution.

Each of the entries in the columns may be fields containing data representing the value of the corresponding field. Thus, for example, column 208 includes values (e.g., the day of the month corresponding to the new cycle date) for each corresponding account. The order of the columns in table 200 is merely exemplary and accordingly the columns indicated in table 200 may be arranged differently, consistent with embodiments of the present invention.

As further illustrated in FIG. 2, each row of table 200 provides information concerning the various cycle dates and transaction post dates for the accounts whose information is stored in the accounts database. Thus, for example, row 220 contains data representing the various dates corresponding to an account identified in column 202 and row 220. Similarly, rows 230 and 240 contain values of the data, including cycle dates and transaction post dates, corresponding to the accounts identified in column 202. Although only three accounts (0001, 0002, 0003) are illustrated in table 200, any number of accounts may be represented in the accounts table, consistent with embodiments of the invention.

Figure 3:
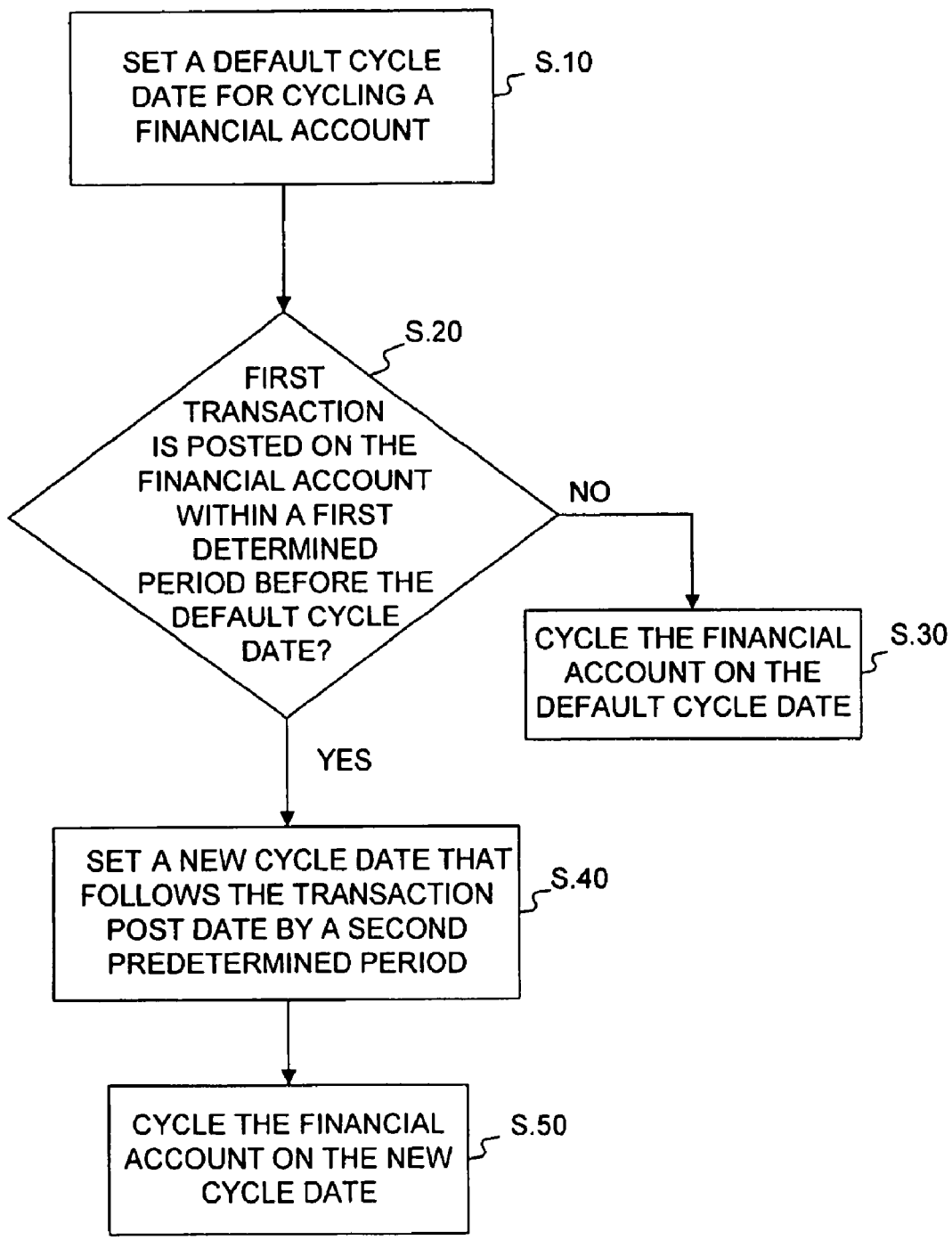
FIG. 3 is a flowchart for an exemplary method for triggering cycling of an account based on a transaction, consistent with embodiments of the present invention.

FIG. 3 depicts a flowchart of an exemplary method for setting a cycle date, consistent with embodiments of the present invention. The features and functionality of this exemplary method may be implemented by account monitoring module 110 and cycling module 112, when executed by CPU 100 (see FIG. 1). In one implementation consistent with the present invention, account monitoring module 110 may keep track of the transactions posted on a financial account, such as a credit card account and cycling module 112 may set a default cycle date for an account and may also set the cycle date corresponding to the account to a different date based on certain conditions. These modules and their corresponding functionality may be combined into one module or may be distributed into other modules to perform the steps corresponding to the exemplary method of FIG. 3 consistent with the present invention.

As illustrated in FIG. 3, the process begins by setting a default cycle date for cycling a financial account (step S.10). The default cycle date may beset manually (for example, using I/O devices 106) and/or automatically (for example, by cycling module 112 when executed by CPU 100). Further, the default cycle date may be set to a predetermined date for all accounts or predetermined date(s) according to the account type. Alternatively or additionally, the default cycle date may be set according to the account user's credit history or risk score. By way of non-limiting example, the default cycle date for an account may be set to a date that is eighteen to twenty-one days from the day on which the account is opened. Of course, other dates or time periods may be used for setting the default cycle date that are greater or less than this example.

A financial account consistent with embodiments of the present invention may be a credit card account. Embodiments of the invention, however, are not limited to implementations related to credit card accounts and may be applied to other types of financial accounts. For instance, consistent with embodiments of the invention, the financial account may relate to an installment loan, a personal loan, an auto loan, a home equity loan, or any other loan.

As illustrated in FIG. 3, after the default cycle date is set, a determination is made whether a transaction is posted on the financial account within a first predetermined period before the default cycle date (step S.20). By way of example, this step may be performed by account monitoring module 110 based on data contained in accounts database 114. For instance, as part of this step, account monitoring module 110 may compare the transaction post date 206 for an account relative to a first predetermined period. The first predetermined period may be set to a predetermined period for all accounts or predetermined period(s) according to the account type. Alternatively or additionally, the first predetermined period may be set according to the account user's credit history or risk score. In one embodiment consistent with the present invention, the first predetermined period before the default cycle date may be set to a few days. Of course, other periods may be used that are greater or less than this example. Consistent with embodiments of the invention, the first predetermined period may be set manually (for example, using I/O devices 106) and/or automatically (for example, by cycling module 112 when executed by CPU 100).

Referring again to FIG. 3, if the first transaction is not posted within the first predetermined period before the default cycle date (step S.20; No), then the financial account may be cycled on the default cycle date (step S.30). In one implementation cycling the financial account on the default cycle date includes sending a statement, such as a credit card statement, to the financial account holder. In one implementation this step may be performed using the cycling module 112 of FIG. 1.

If the transaction on the financial account is posted within the first predetermined period (step S.20; Yes), then a new cycle date may be set that follows the transaction post date by a second predetermined period (step S.40). By way of example, this step may be performed by cycling module 112 when account monitoring module 110 determines that the transaction is posted within the first predetermined period. As part of this step, cycling module 112 may set a new cycle date 208 for the account based on the second predetermined period. The second predetermined time period may be a predetermined period for all accounts or predetermined period(s) according to the account type. Alternatively or additionally, the second predetermined period may vary according to the account user's credit history or risk score. According to an embodiment of the invention, the new cycle date may be set for example to a day after the transaction is posted on the financial account. Of course, other periods to set the new cycle date may be used that are greater or less than this example. For example, in one embodiment consistent with the present invention the second predetermined period may be zero.

As illustrated in FIG. 3, the financial account may be cycled on the new cycle date (step S.50). Thus, for example, a first statement relating to the financial account may be sent to the holder of the financial account on the new cycle date, or as soon as possible after the new cycle date. In one implementation this step may be performed using the cycling module 112 of FIG. 1.

In one embodiment consistent with the present invention, the cycle date for future cycles of the financial account is reset or set as a date that comes after a third predetermined period from the new cycle date. For example, the new cycle date may be set back to the default cycle date. Additionally or alternatively, modification of the cycle date may be triggered depending on whether the user or customer has available credit and/or has timely made any necessary payments.

Figure 4:
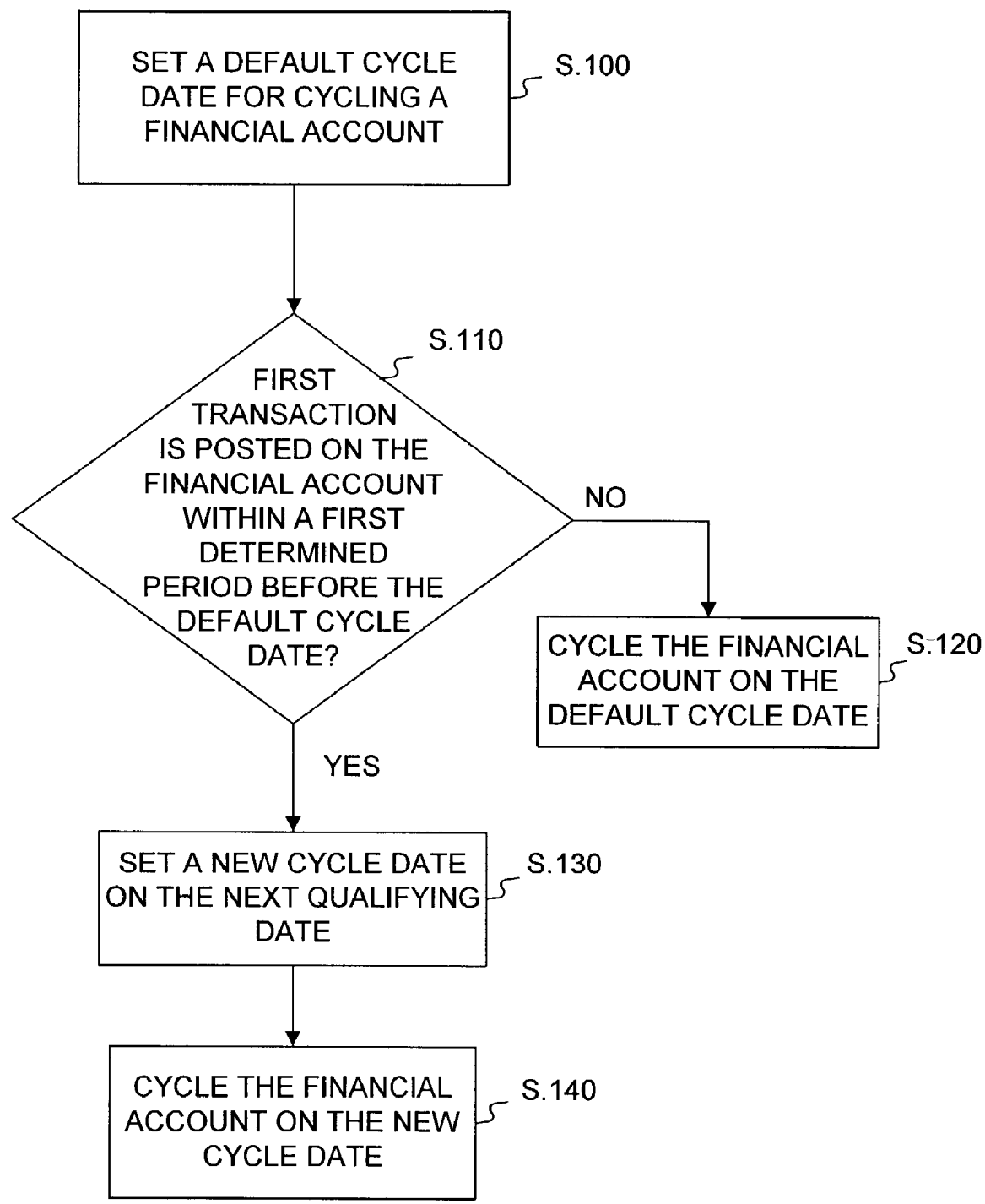
FIG. 4 is a flowchart for another exemplary method for triggering cycling of an account based on a transaction, consistent with embodiments of the present invention.

FIG. 4 is a flowchart for another exemplary method for triggering cycling of an account, consistent with embodiments of the present invention. As with the embodiment of FIG. 3, the features and functionality of the exemplary method of FIG. 4 may be implemented by account monitoring module 110 and cycling module 112, when executed by CPU 100 (see FIG. 1). In one implementation consistent with the present invention, account monitoring module 110 may keep track of the transactions posted on a financial account, such as a credit card account and cycling module 112 may set a default cycle date for an account and may also set the cycle date corresponding to the account to a different date based on certain conditions. These modules and their corresponding functionality may be combined into one module or may be distributed into other modules to perform the steps corresponding to the exemplary method of FIG. 4 consistent with the present invention.

As illustrated in FIG. 4, the process begins by setting a default cycle date for cycling a financial account (step S.100). As with step S.10 of FIG. 3, this step of FIG. 4 may involve manually (for example, using I/O devices 106) and/or automatically (for example, by cycling module 112 when executed by CPU 100) setting the default cycle date. Further, the default cycle date may be set to a predetermined date for all accounts or predetermined date(s) according to the account type. Alternatively or additionally, the default cycle date may be set according to the account user's credit history or risk score. By way of non-limiting example, the default cycle date for an account may be set to a date that is eighteen to twenty-one days from the day on which the account is opened. Of course, other dates or time periods may be used for setting the default cycle date that are greater or less than this example.

Next, as shown in FIG. 4, a determination is made whether a transaction is posted on the financial account within a first predetermined period before the default cycle date (step S.110). Once again, this step may be performed by analyzing the data of an accounts database, such as accounts database 114 of FIG. 1. If no transaction is posted on the financial account within the predetermined period before the default cycle date (step S.110; No), then the financial account is cycled on the default cycle date. Thus, for example, an account statement relating to the financial account may be sent to the holder of the financial account on the default cycle date. For new accounts, the account statement may be the first account statement that is sent to the customer or user. Such an account statement may indicate the transaction(s) posted to the account and the date on which payment (if any) is due. In one implementation this step may be performed using cycling module 112 of FIG. 1.

If, however, a transaction is posted on the financial account within the predetermined period before the default cycle date (step S.110; Yes), then a new cycle date is set based on a next qualifying date (step S.130). Consistent with embodiments of the invention, the new cycle date may be set according to date(s) associated with various qualifying criteria. For instance, in one embodiment consistent with the present invention, the next qualifying date may be the date on which the financial account holder's zip-code qualifies for a postage discount. In other embodiments other criteria, such as the risk assessment of the financial account, the operational efficiencies of the financial institution, or account characteristics, for example, the amount of a particular transaction or the credit limit of the account may be used to determine the next qualifying date.

Referring again to FIG. 4, after the new cycle date is set (step S.130), the financial account is cycled on the new cycle date (step S.140). For instance, using the new cycle date, the cycling module 112 may cause an account statement to be sent to the user of the financial account. An account statement may be sent electronically or may be posted, for example, on a website on the Internet.

In one embodiment consistent with the present invention, the cycle date for the future cycles of the account may be set such that it follows the new cycle date by a second predetermined period. In another embodiment of the invention, the new cycle date may be set back to the default cycle date. Additionally or alternatively, modification of the cycle date may be triggered depending on whether the user or customer has available credit and/or has timely made any necessary payments.

Consistent with embodiments of the present invention, systems are provided for setting a cycle date for a financial account. Such systems may comprise means for setting a default cycle date for cycling the financial account. In one embodiment of the invention the means for setting a default cycle date for the cycling the financial account may comprise the cycling module 112 of FIG. 1.

Systems of embodiments of the invention may further include means for determining whether a transaction is posted on the financial account within a first predetermined period before the default cycle date. In one embodiment of the present invention, the means for determining whether a transaction is posted on the financial account within a first predetermined period before the default cycle date may comprise the account monitoring module 110 of FIG. 1.

Such systems may further include means for setting a new cycle date that follows the transaction post date by a second predetermined period, if the transaction is posted on the financial account within a first predetermined period before the default cycle date. In one embodiment of the present invention, the means for setting a new cycle date that follows the transaction post date by a second predetermined period may comprise the cycling module 112 of FIG. 1.

Systems of embodiments of the invention may further include means for setting the cycle date for future cycles of the financial account as a date that comes after a third predetermined period from the new cycle date. In one exemplary system the means for setting the cycle date for the future cycles of the financial account as a date that comes after a third predetermined period from the new cycle date may comprise the cycling module 112 of FIG. 1.

Consistent with additional embodiments of the invention, systems are provided that include means for setting the new cycle date based on a next qualifying date, if the transaction is posted on the financial account within the first predetermined period before the default cycle date. In one exemplary system the means for setting the new cycle date based on a next qualifying date may comprise the cycling module According to yet another embodiment consistent with the present invention a method for setting a cycle date for a credit card account is provided. The method sets a default cycle date, when the credit card account is first established, for cycling the credit card account. This step may be performed using cycling module 112 of FIG. 1

The method then determines whether a transaction is posted on the credit card account before the default cycle date. This step may be performed using account monitoring module 110 of FIG. 1. If the transaction is posted before the default cycle date, then the method sets a new cycle date that follows the transaction post date by a predetermined period. The method then cycles the credit card account, wherein cycling the credit card account includes sending a first account statement to a holder of the credit card account. Each of the previous two steps may be performed using cycling module 112 of FIG. 1.

Other modifications and embodiments of the invention will be apparent to those skilled in the art from consideration of the specification and practice of the invention disclosed herein. For example, one skilled in the art will appreciate that the systems and methods consistent with the present invention may be distributed among various components over various computers. Further, although embodiments of the invention have been described herein with reference to financial products or services, systems and methods consistent with the invention may also be adapted for cycling accounts corresponding to other types of products or services.

Therefore, it is intended that the specification and examples be considered as exemplary only, with a true scope and spirit of the embodiments of the invention being indicated by the following claims.

What is claimed is:

1. A method for setting a cycle date for a financial account, the method comprising:
   setting, by a computer system, a default cycle date for cycling the financial account;
   determining, by the computer system, that a transaction is posted on the financial account on a transaction post date within a first predetermined period before the default cycle date; and
   in response to the step of determining, setting, by the computer system, a new cycle date that follows the transaction post date by a second predetermined period, wherein the new cycle date is before the default cycle date.

2. The method of claim 1, further comprising:
   setting a future cycle date to a date that is a third predetermined period from the new cycle date.

3. The method of claim 1, wherein the financial account is a credit card account.

4. The method of claim 1, wherein the financial account is one of an installment loan account, a personal loan account, an auto loan account, or a home equity loan account.

5. A system for setting a cycle date for a financial account, the system comprising:
   means for setting a default cycle date for cycling the financial account;
   means for determining that a transaction is posted on the financial account on a transaction post date within a first predetermined period before the default cycle date; and
   means for, in response to the determining, setting a new cycle date that follows the transaction post date by a second predetermined period, wherein the new cycle date is before the default cycle date.

6. The system of claim 5, further comprising:
   means for setting a future cycle date to a date that is a third predetermined period from the new cycle date.

7. The system of claim 5, wherein the financial account is a credit card account.

8. The system of claim 5, wherein the financial account is one of an installment loan account, a personal loan account, an auto loan account, or a home equity loan account.

9. A computer-readable medium having a program for causing, when executed by a processor, a computer to execute a method for setting a cycle date for a financial account, the method comprising:
   setting a default cycle date for cycling the financial account;
   determining that a transaction is posted on the financial account on a transaction post date within a first predetermined period before the default cycle date; and
   in response to the step of determining, setting a new cycle date that follows the transaction post date by a second predetermined period, wherein the new cycle date is before the default cycle date.

10. The computer-readable medium of claim 9, further comprising:
    setting a future cycle date to a date that is a third predetermined period from the new cycle date.

11. The computer-readable medium of claim 9, wherein the financial account is a credit card account.

12. The computer-readable medium of claim 9, wherein the financial account is one of an installment loan account, a personal loan account, an auto loan account, or a home equity loan account.

* * * * *